United States Patent
Ruizandrade

(10) Patent No.: US 7,076,496 B1
(45) Date of Patent: Jul. 11, 2006

(54) METHOD AND SYSTEM FOR SERVER BASED SOFTWARE PRODUCT RELEASE VERSION TRACKING

(75) Inventor: Guillermo Ruizandrade, San Jose, CA (US)

(73) Assignee: 3Com Corporation, Marlborough, MA (US)

( * ) Notice: Subject to any disclaimer, the term of this patent is extended or adjusted under 35 U.S.C. 154(b) by 328 days.

(21) Appl. No.: 09/967,053

(22) Filed: Sep. 27, 2001

Related U.S. Application Data

(60) Provisional application No. 60/271,330, filed on Feb. 23, 2001.

(51) Int. Cl.
*G06F 17/30* (2006.01)

(52) U.S. Cl. .................. 707/102; 717/103; 717/170

(58) Field of Classification Search ............ 707/203, 707/102; 717/103, 170
See application file for complete search history.

(56) References Cited

U.S. PATENT DOCUMENTS

| | | | | |
|---|---|---|---|---|
| 4,853,843 A | * | 8/1989 | Ecklund .................. 707/203 |
| 5,339,430 A | * | 8/1994 | Lundin et al. ............ 719/332 |
| 5,440,738 A | * | 8/1995 | Bowman et al. ............ 707/6 |
| 5,608,865 A | * | 3/1997 | Midgely et al. ............ 714/1 |
| 5,675,802 A | * | 10/1997 | Allen et al. ............ 717/103 |
| 5,845,077 A | * | 12/1998 | Fawcett .................. 709/221 |
| 5,905,990 A | * | 5/1999 | Inglett .................. 707/200 |
| 6,049,671 A | * | 4/2000 | Slivka et al. ............ 717/173 |
| 6,212,512 B1 | * | 4/2001 | Barney et al. ............ 707/1 |
| 6,366,930 B1 | * | 4/2002 | Parker et al. ............ 707/203 |
| 6,381,742 B1 | * | 4/2002 | Forbes et al. ............ 717/176 |
| 6,557,054 B1 | * | 4/2003 | Reisman .................. 710/33 |
| 6,574,655 B1 | * | 6/2003 | Libert et al. ............ 709/200 |
| 6,645,077 B1 | * | 11/2003 | Rowe .................... 463/42 |
| 6,757,893 B1 | * | 6/2004 | Haikin .................. 717/170 |
| 6,766,334 B1 | * | 7/2004 | Kaler et al. ............ 707/203 |
| 2001/0032170 A1 | * | 10/2001 | Sheth .................... 705/37 |
| 2003/0107588 A1 | * | 6/2003 | Elsbree et al. ............ 345/700 |

* cited by examiner

Primary Examiner—Wayne Amsbury

(57) ABSTRACT

A method for maintaining software product version tracking in a client/server computer system environment. The method includes the step of storing a plurality of software product versions within a database. A plurality of directories of the database are traversed to determine paths for each of the plurality of software product versions, the traversing performed by a server. At least one of the software product versions is select for updating, the selecting performed by one of a plurality of clients. The one software product version is edited using the one client and a resulting new software product version is subsequently returned to the database. Using the server, the directories of the database are updated to chronologically track the new software product version to ensure the paths for each of the plurality of software product versions and the new software product version are available to the plurality of clients.

24 Claims, 12 Drawing Sheets

Product Client Component

If the target location directory does not exist, the user is prompted to accept or deny the creation of such directory.

Product Server Component

The product Server component resides in the server, where the versions data base is located.
This component creates a tree file structure inside a file containing the actual path of the physical files

Product Client Component

The client component resides in the client machine and by a virtual link maintains a connection to the version database.

Product Client Component

The user double clicks in the desired item to be downloaded.
Then the user is prompted for the location target to download the image.

Product Client Component

If the target location directory does not exist, the user is prompted to accept or deny the creation of such directory.

Product Client Component

While the process of downloading is in progress the user, can see the action by means of a copy animation box

Product Client Component

At the end of the downloading process, the user is informed of the source and target paths. This is indicated by the product dialog box in the Last Selection and Download to fields.

Product Client Component

Product also provides the functionality of comparing two versions.

Product Client Component

The result of the comparison is shown using WinDif program.

METHOD AND SYSTEM FOR SERVER BASED SOFTWARE PRODUCT RELEASE VERSION TRACKING

This application claims the benefit of earlier filed provisional application Ser. No. 60/271,330, filed on Feb. 23, 2001.

FIELD OF THE INVENTION

The field of the present invention pertains to software product development. More particularly, the present invention relates to a method and system for monitoring software products as they flow through the various stages of software development and efficiently implementing a tracking system for managing updates and changes.

BACKGROUND OF THE INVENTION

One of the most important societal changes of recent times has been the emergence of information systems, more particularly, digital computer systems, for managing and accessing information, entertainment, etc. Digital information systems (e.g., the Internet) have emerged as a predominant communications medium. Digital information systems enable the navigable aggregation of information, for example Web page content, among all the connected devices. A fundamental component of virtually all digital information systems is the software based applications which provide their functionality. Software applications general refers to software based components, programs, products, and the like which when executed by a digital computer system device (e.g., desktop computer system, handheld computer system, cellphone, etc.) implement the device functionality for the user.

Software applications are typically developed by teams specialists (e.g., programmers, software engineers, etc.). Programmers, or software application authors, typically use specialized software to design and build a software application. For example, a set of specialized software applications (e.g., a software development toolkit, or "SDK") can be used to help programmers write an application. For building software application graphical interfaces, the SDK provides the tools and libraries for creating menus, dialog boxes, fonts and icons. The SDK provides the means to link the application to libraries of software routines and to link it with the operating environment (OS, DBMS, protocol, etc.). A typical SDK can also include a programming language and related components. It can include the compiler, text editor, debugger, function library and any other supporting programs that enable a programmer to write a program. SDKs are generally designed to make the process of designing and building software applications more efficient.

A well-known problem exists however due to the fact that, despite the use of SDKs, complex software applications can take many months, or even years, to complete. A complex software applications can involve large teams of software engineers working cooperatively on various parts of the application simultaneously. Accordingly, keeping track of such a large project such as a development of a complex software application is extremely critical task. Many large software projects have ultimately failed due to lack of configuration management.

As known by those skilled in the art, configuration management with respect to software development refers to a systematic method and mechanism for keeping track of large projects. Although prior art "version control" schemes, which maintain a database of revisions, is part of such a system, a full-blown software configuration management system (SCM system or CM system) must at minimum automatically document all components used to build the various executable program building blocks of a project. Prior art software configuration management systems are typically able to recreate each "build" as well as to recreate earlier builds in order to maintain previous versions of a product. Prior art software configuration management systems may also be used to prevent unauthorized access to files or to alert the appropriate users when a file has been altered.

Prior art software configuration management systems have a number problems. A typical SCM system is separate from the software development process. For example, engineers must go through elaborate procedures in order to "checkout" software from a central repository in order to make updates or changes during a design and development process. These same procedures typically also apply during a quality assurance process as the software is carefully tested and prepared for release. Prior art SCM systems also utilize inefficient mechanisms for accessing previous versions of a software product. Usually, only the most recent releases are available to the development/quality assurance engineers. Where access is allowed to multiple previous versions, there often exists problems in keeping track of the different versions of the software product. Additionally, the check-in/check-out mechanisms of many prior art SCM systems increase the amount of time required, for example, for software product debugging between various versions.

Thus, what is required is a way to simplify the process of maintaining a software product version tracking system. What is required is a solution that renders the software configuration management process much easier than the prior art. What is required is a solution that simplifies the changing and maintaining of different software product versions within a software development/software quality assurance environment. The present invention provides a novel solution to these requirements.

SUMMARY OF THE INVENTION

The present invention provides a way to simplify the process of maintaining a software product version tracking system. The present invention provides a solution that renders the software configuration management process much easier than the prior art. The present invention provides a solution that simplifies the changing and maintaining of different software product versions within a software development/software quality assurance environment.

In one embodiment, the present invention is implemented as a client/server based software product release version tracking method. The method functions in part by maintaining software product version tracking in a client/server computer system environment. The method includes the step of storing a plurality of software product versions within a database. A plurality of directories of the database are traversed to determine paths for each of the software product versions. The traversing is performed by a server. As the design or quality assurance process progresses, at least one of the software product versions is select for updating (e.g., by a quality assurance engineer), the selecting performed by one of a plurality of clients. The one software product version is edited using the one client and a resulting new software product version (e.g., containing the changes or alterations) is subsequently returned to the database. Using the server, the directories of the database are updated to chronologically track the new software product version and to ensure the paths for each of the software product versions, including the new software product version, are available to the clients.

In another embodiment, a software based server component can be executed on the server computer system in order to make the new software product version visible to the clients. Using the server, the method can include creating a file containing the paths for each of the software product versions, the file used by the clients to access to software product versions. Using the server, a chronological arrangement of the software product versions can be maintained and a tree data structure for tracking one or more chronological arrangements of the software product versions can be maintained. A number of tree data structures can be maintained, for example, one tree structure for each software development project or software development quality assurance group, which can be accessed via the graphical user interface of the clients.

In another embodiment, a software based client component can be executed on the client computer system. The client component can generate a graphical user interface for the presentation of software product version information to the engineers (e.g., on a workstation display). The graphical user interface can, for example, visually depict the tree data structures that track the various software product versions.

Thus, a number of engineers can alter, modify, redefine, and otherwise manage the software product versions of an entire project through the intuitive graphical user interface representation of the client component. In this manner, the present invention provides a solution that renders the update and maintenance process of a number of software product versions of, for example, a large software project, much easier than the prior art, and simplifies the changing and maintaining of software product versions within a database.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Figure 1:
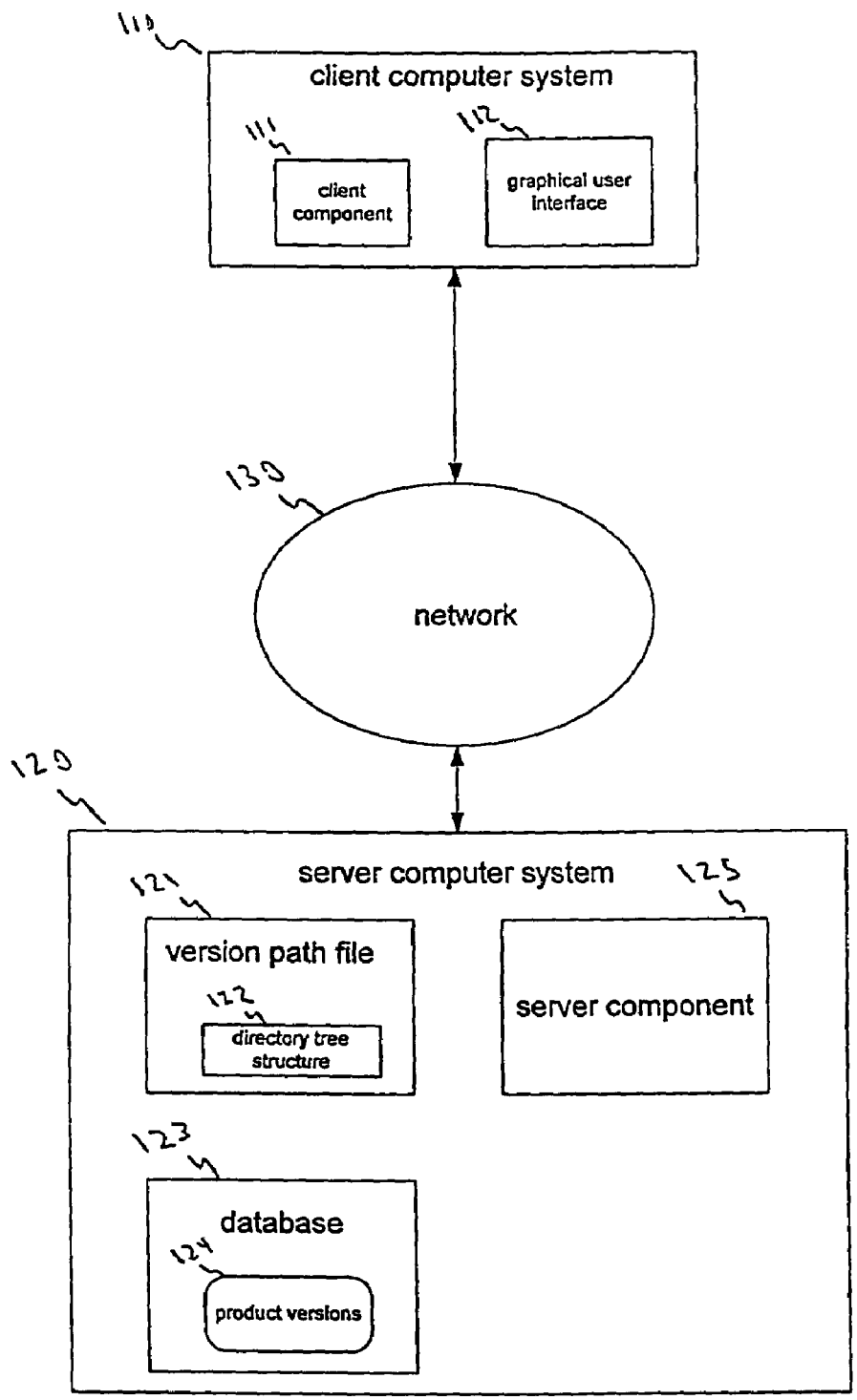
FIG. 1 shows a diagram of a software product version tracking system in accordance with one embodiment of the present invention.

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Embodiments of the present invention are directed towards a computer implemented method for maintaining software product version tracking. The present invention provides a solution that renders the software configuration management process much easier than the prior art. The present invention provides a solution that simplifies the changing and maintaining of different software product versions within a software development/software quality assurance environment. The present invention and its benefits are further described below.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "communicating" or "instantiating" or "registering" or "displaying" or the like, refer to the action and processes of a computer system (e.g., computer system 512 of FIG. 12), or similar electronic computing device, that manipulates and transforms data represented as physical (electronic) quantities within the computer system's registers and memories into other data similarly represented as physical quantities within the computer system memories or registers or other such information storage, transmission or display devices.

Method and System of the Invention

FIG. 1 shows a diagram of a software product version tracking system 100 in accordance with one embodiment of the present invention. As depicted in FIG. 1, the tracking system 100 includes a client computer system 110 (hereafter client 110) coupled to a server computer system 120 (hereafter server 120) via a network 130. A software based client component 111 executes on the computer system platform of client 110. Client component 111 generates a graphical user interface 112 for interacting with a user. A software based server component 125 executes on the computer system platform of server 120. A version path file 121 and associated directory tree data structures 122 are maintained on the server 120. A database 123 containing a plurality of software product versions 124 is also maintained on the server computer system 120.

Referring to system 100 of the present embodiment, system 100 functions by providing a client/server based software product version tracking process. The product version tracking process is used by, for example, a software design group as the group works on a number of software components of a large project. Software product version tracking is an integral part of software configuration management. As is well known, software configuration management is indispensable to the successful completion of large software design projects. A large software design project can encompass a project taking, for example, 10 engineers three months to complete, or even 1000 engineers (or more) three years (or more) to complete.

System 100 is a client/server based computer system. A client/server computer system environment is used for maintaining software product version tracking in order to efficiently provide access to the software product versions by a large number of users. In this embodiment, each of the users (e.g., typically software engineers, quality assurance engineers, or the like) access a plurality of software product versions 124 via their respective client computer systems. One such client 110 is shown in FIG. 1.

A server component 125 executes on the computer system platform provided by server 120. The server component 125 interacts with client 110 to provide requested software product versions retrieved from database 123 and to receive updated software product versions from client 110 and store them within database 123. The server component 125 interacts with the version path file 121 and the database 123 in order to implement the software product version tracking functionality of the present embodiment.

In the present embodiment, system 100 stores each of the software product versions (e.g., product versions 124) within the database 123. The software product versions can be stored as images (e.g., copies) within the data schema of database 123. Database 123 thus functions as a repository for each of the software product versions that are generated. Database 123 can be implemented using a number of different database products.

Referring still to system 100 of the present embodiment, version path file 121 functions in part as a directory of each of the software product versions 124 stored within database 123. In the present embodiment, the version path file 121 is created by and maintained by server component 125. In updating the version path file 121, server component 125 traverses a plurality of directories of the database 123 to determine paths for each of the plurality of software product versions 124.

A directory tree structure 122 is used to catalog file paths to the product versions 124. Server component 125 traverses through the data schemas of database 123 in order to determine accurate file paths for each of the software product versions 124 stored therein. This information is stored in directory tree structure 122. The directory tree structure 122 provides a logical and intuitive data structure for viewing the relationships between the various software product versions 124. For example, to determine the relationship between a number of different software product versions, the directory tree structure can be accessed and viewed via the graphical user interface 112 of client computer system 110.

The software product versions are edited using the client computer systems. For example, new software product versions are created by editing an earlier software product version. The earlier software product version is selected from the product versions 124 using the graphical user interface 112. In the present embodiment, an image of the earlier software product version is transferred from the server 120 to the client 110. For example, the user can graphically selected the desired earlier software product version by clicking on the earlier version in the depicted directory tree (e.g., corresponding to the directory tree structure 122) and then assigning a location to which the earlier version will be downloaded. The earlier software product version is then edited using the one client and a resulting new software product version is subsequently returned from client 110 to the server 120. Server component 125 then stores the new software product version within the database 123 and updates the directory tree structure 122 of version path file 121 to reflect the new software product version.

Using server component 125, the directory tree structure 122 of the database is updated to chronologically track the new software product version to ensure the paths for each of the plurality of software product versions and the new software product version are available to the plurality of clients. A plurality of tree data structures 122 can be maintained, for example, one tree structure 122 for each software development project or software development quality assurance group, which can be accessed via the graphical user interface 112 of the clients.

Referring still to system 100 FIG. 1, system 100 provides for comprehensive software product version control and maintains a database 123 containing the large number of revisions and different versions 124 and automatically documents all software product versions used, for example, to build large executable programs. By maintaining a database 123 of all the previous product versions 124, system 100 is able to recreate each "build" as well as to recreate earlier environments in order to maintain previous versions of a product.

The maintaining of all previous product versions 124 provides for comprehensive regression testing. In case of error or nonfunctional code, system 100 is able to support comprehensive regression testing in order to "roll back" to a previous version in the event of errors or problems with new software product versions. For example, previous versions can be downloaded to client 110 and compared with later versions in order to discover the exact point at which an error or bug was introduced. Differences within the code can be pinpointed to make the debugging process more efficient.

Since system 100 is based upon a client/server architecture, system 100 can utilize a secure login system in order to prevent unauthorized access to files, or to alert the appropriate users when a file has been altered. For example, each client can be required to provide a secure login in order to gain access to the product versions 124. Additionally, different product versions can be restricted to different groups of users. For example, different software groups can have access to their respective directory tree 122 and associated product versions 124, while being blocked from access to other directory trees 122 and other product versions 124.

Thus, system 100 provides a number of advantages. The product version tracking system of the present invention is an integral part of the software development process. For example, in a typical embodiment, at any given time of a software quality assurance process, each of the versions of the product in the testing state are available to a software quality assurance group. The versions are made available without requiring the engineers to go through elaborate procedures in order to "checkout" software from a central repository. This results in an increase of efficiency since it shortens the time required for testing setup. Additionally, by decoupling the process of software quality assurance from the software design, a quality assurance group will not be interfering in the creation of each new version and can have access limited to authorized versions. Therefore, for example, software quality assurance groups can avoid wasting time in testing a non-valid version. An additional advantage is the fact that since the product versions 124 are maintained in central server 120, each accessing quality assurance engineer will be working on the same image, resulting in a unified testing process.

Figure 2:
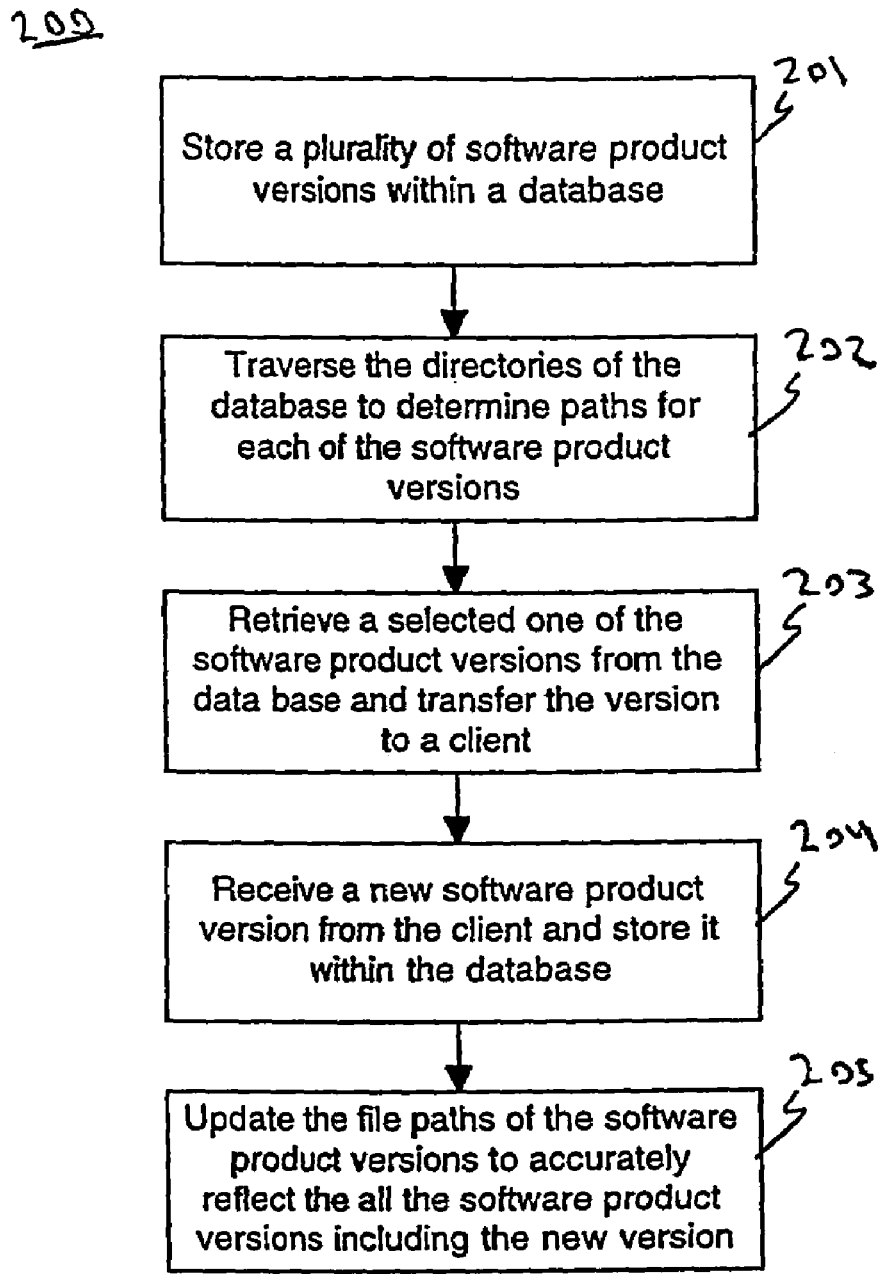
FIG. 2 shows a flowchart of the steps of a first process in accordance with one embodiment of the present invention is shown.

Referring now to FIG. 2, a flowchart of the steps of a process 200 in accordance with one embodiment of the present invention is shown. Process 200 shows the steps performed by server component 125 in implementing a software product version tracking process in accordance with a system 100 embodiment of the present invention.

Process 200 begins in step 201, where a plurality of software product versions 124 are stored within database 123 by the server component 125. In step 202, a plurality of directories of the database 123 are traversed to determine paths for each of the plurality of software product versions 124. The result of the traversing is one or more directory tree structures 122 stored in a version path file 121. As described above, the version path file 121 contains the paths to each of the software product versions 124. In step 203, in response to a selection from the client 110, one of the software product versions is retrieved from database 123 and transferred via network 130 to the client component 111 of the client 110.

Referring still to process 200 of FIG. 2, in step 204, a resulting new software product version is received from the client 110 and is stored within database 123. As described above, editing and/or changes to the software product version checked out by client 110 are performed on client 110. The resulting new software product version is checked back into the database 123 via the server component 125. Subsequently, in step 205, the directory tree structure 122 and the version path file 121 are updated by server component 125 to reflect the new software product version. As described above, the directory tree structure 122 in the version path file 121 can be updated to chronologically track the new software product version to ensure the paths for each of the plurality of software product versions and the new software product version are available to the plurality of clients.

Figure 3:
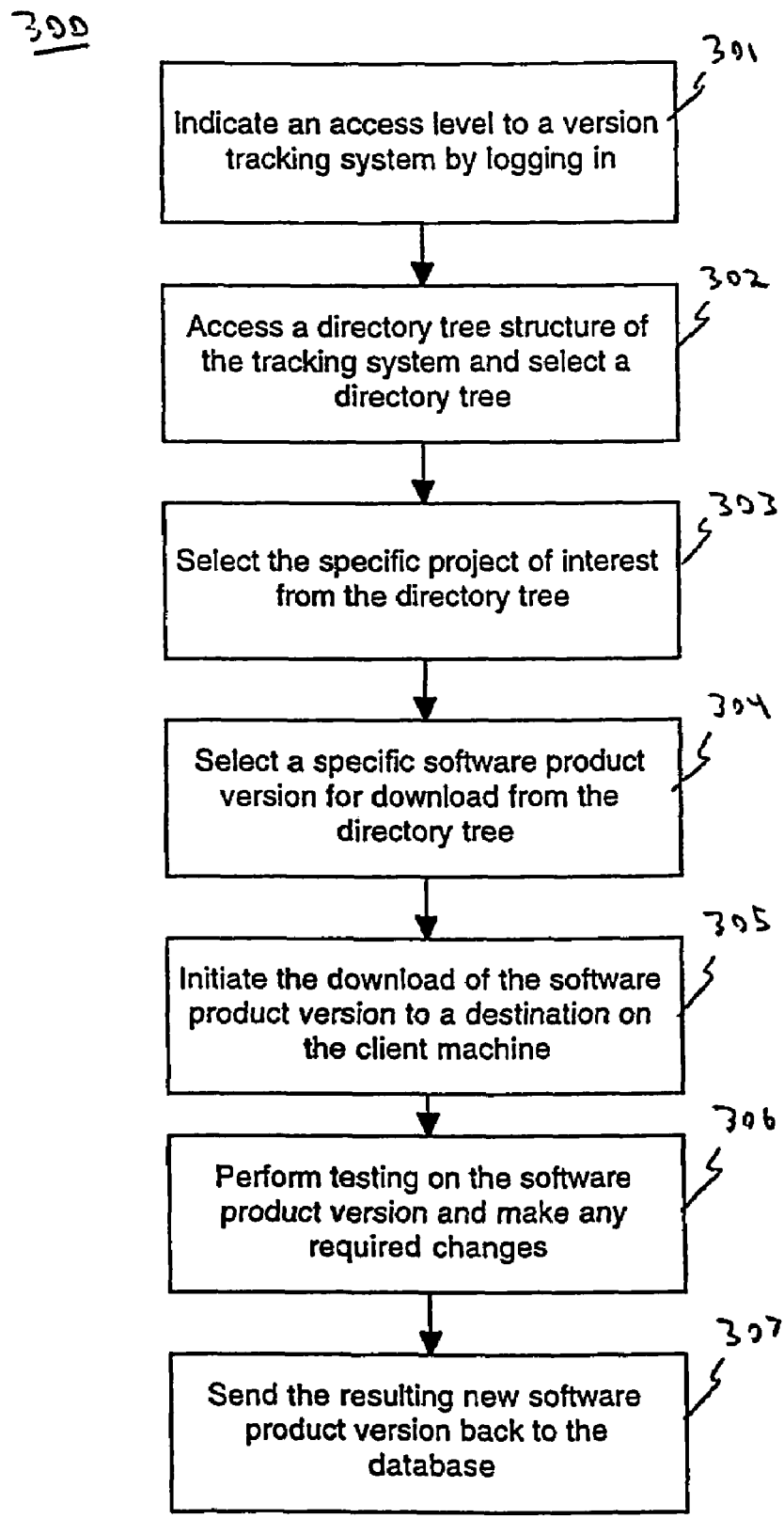
FIG. 3 shows a flowchart of the steps of a second process in accordance with one embodiment of the present invention.

Referring now to FIG. 3, a flowchart of the steps of the process 300 in accordance with one embodiment of the present invention is shown. Process 300 shows the steps performed by a client component 111 in implementing a software product version tracking process in accordance with a system 100 embodiment of the present invention.

Process 300 begins in step 301, were the user as indicates his access level to system 100. As described above, a login procedure can be used, wherein users having different access levels login to system 100 using different passwords. In step 302, a user, through the graphical user interface 112, accesses the directory tree structure 122 and selects an appropriate one of directory trees 122 (e.g., the directory tree corresponding to the user's product division). The interaction between the server 120 and the graphical user interface 112 is accomplished by the client component 111. In step 303, once the specific directory tree 122 has been selected, the user selects the specific project with which he is working. In step 304, the user then selects the specific software product version he wishes to download to the client 110. In step 305, the download is initiated. As described above, the user provides the destination directory to which the software product version will be downloaded. In step 306, testing is performed on the downloaded software product version and changes are made. In step 307, the resulting new software product version is checked back into the database 123 via the graphical user interface 112.

Referring now to FIGS. 4 through 11, a series of graphical user interface presentations as depicted by the graphical user interface 112 are shown. FIGS. 4 through 11 illustrate the different graphical user interface presentations provided to a user as the user interacts with the client component 111 and the server component 125 of system 100. For example, FIGS. 4 through 11 illustrate the user's interaction with the directory tree structure 122 during the process of selecting and downloading a software product version.

Figure 4:
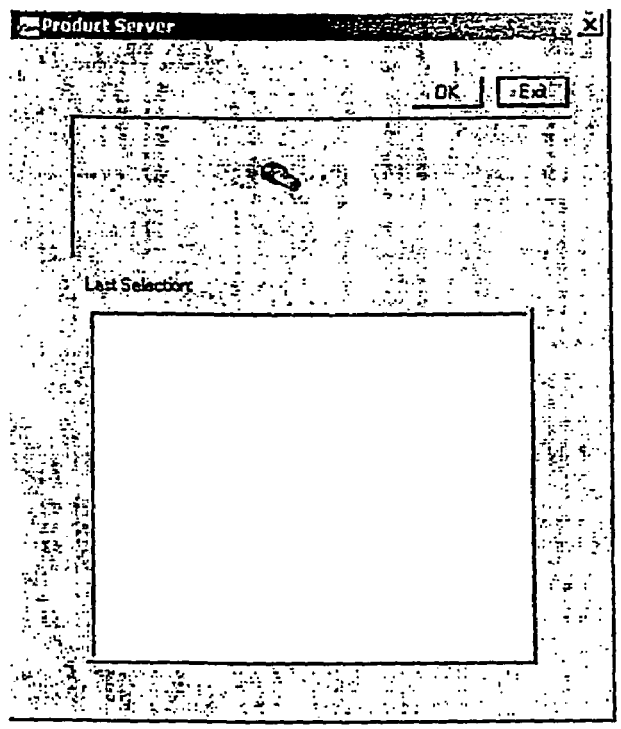
FIG. 4 shows the user's view of the product server component through the graphical user interface in accordance with one embodiment of the present invention.
Figure 5:
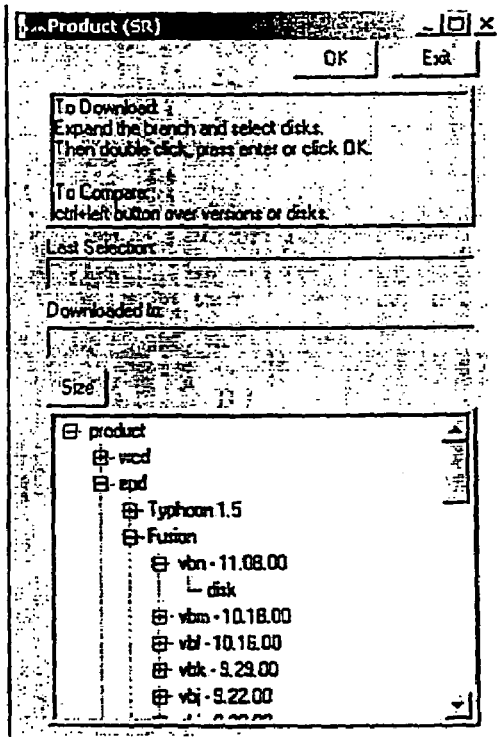
FIG. 5 shows a tree structure view of the directory tree structure created by the client component in accordance with one embodiment of the present invention.
Figure 6:
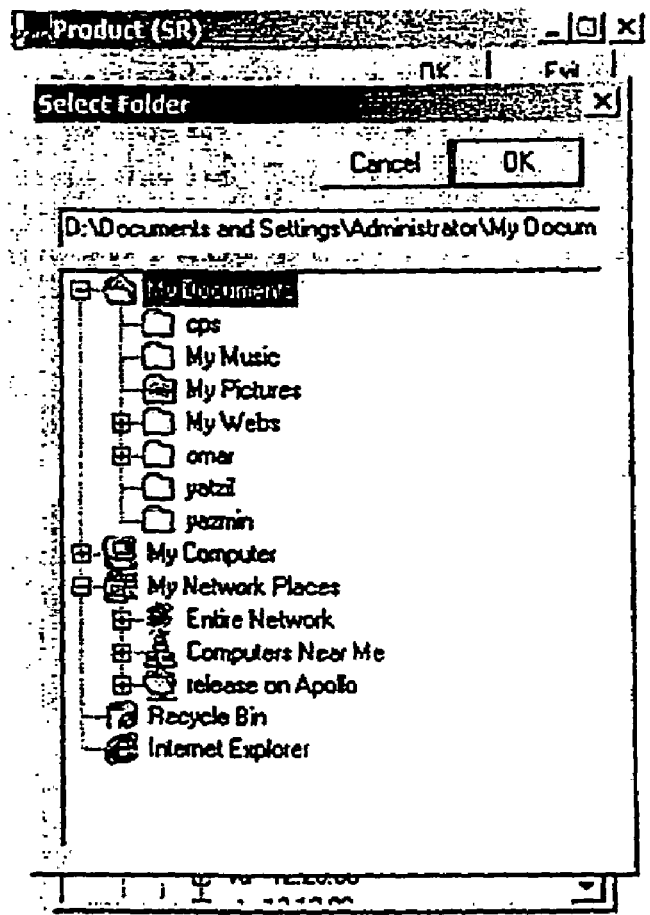
FIG. 6 shows the case where the user selects a desired item to be downloaded to client machine in accordance with one embodiment of the present invention.
Figure 7:
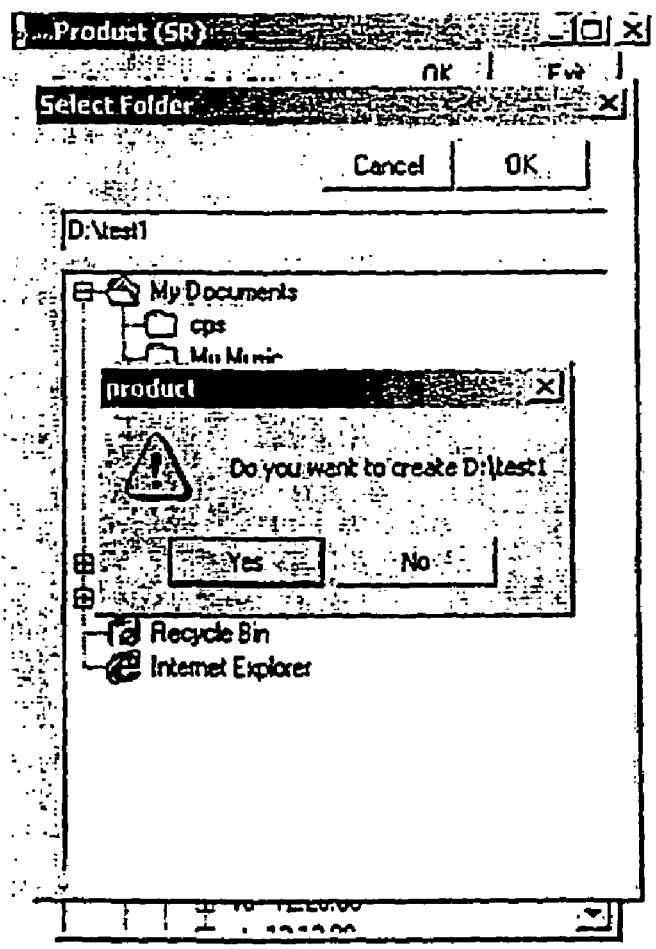
FIG. 7 shows the graphical user interface presentation where the target location for download does not exist, and the user is prompted for creating a target directory for the download in accordance with one embodiment of the present invention.
Figure 8:
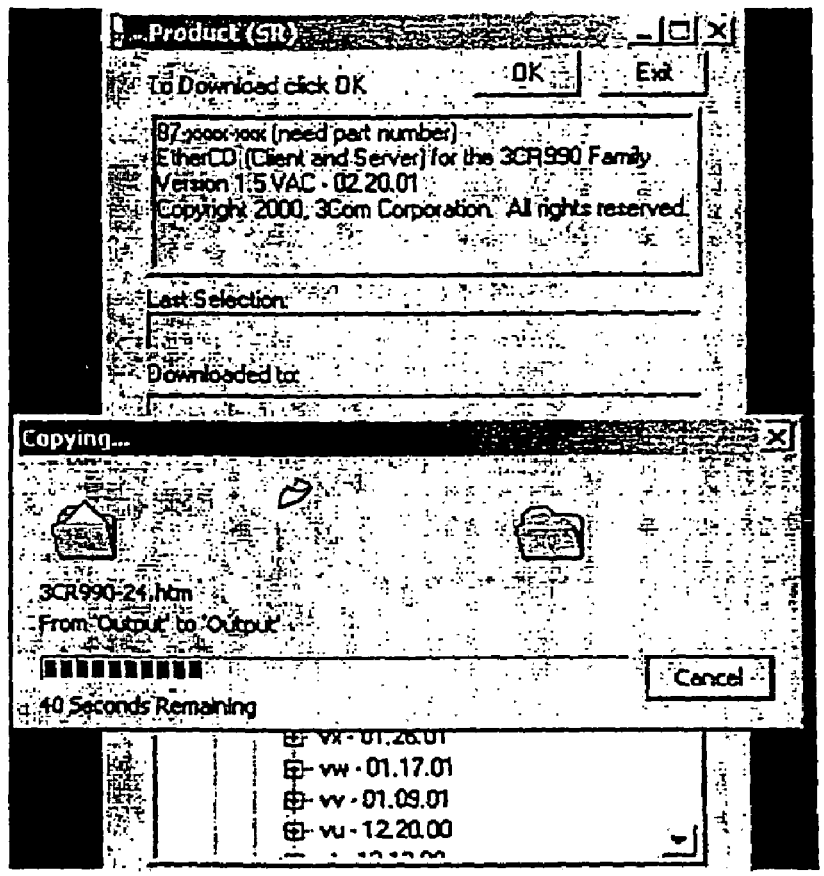
FIG. 8 shows the graphical user interface presentation to the user once the the download process has begun in accordance with one embodiment of the present invention.
Figure 9:
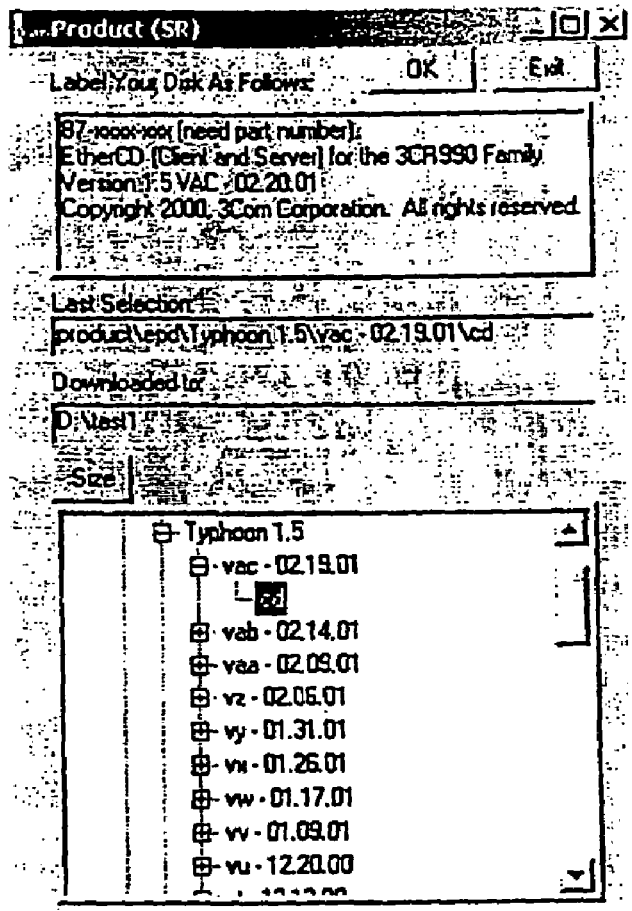
FIG. 9 shows the graphical user interface presentation of the source and target paths of the download in order to allow the user to verify the correct file(s) were transferred in accordance with one embodiment of the present invention.
Figure 10:
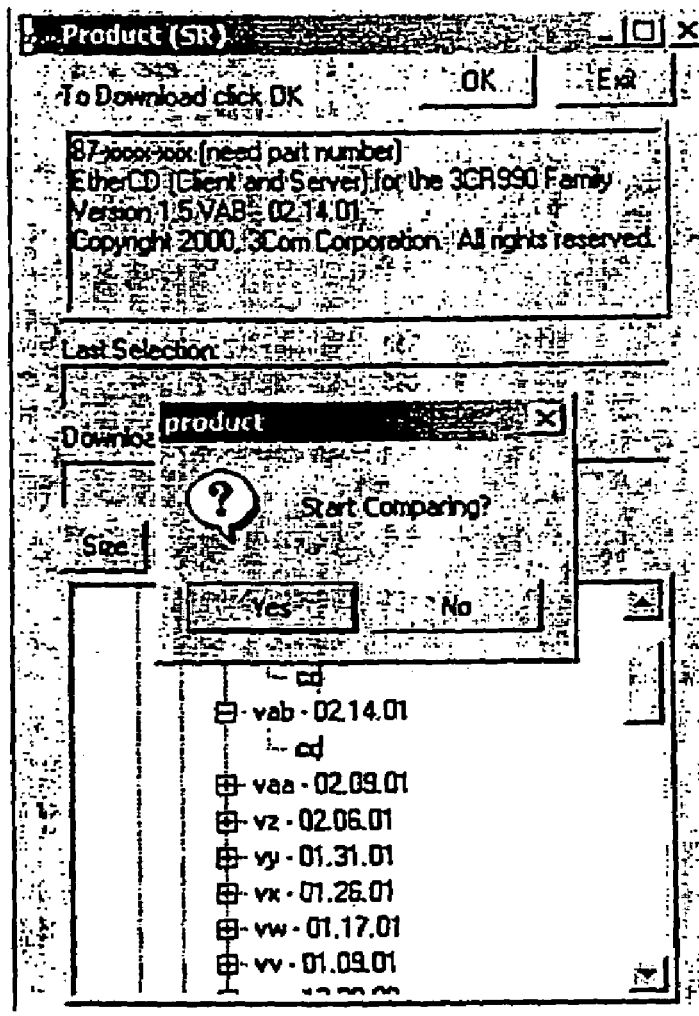
FIG. 10 shows the comparing functionality presentation seen by the user when to different software product versions are compared in accordance with one embodiment of the present invention.
Figure 11:
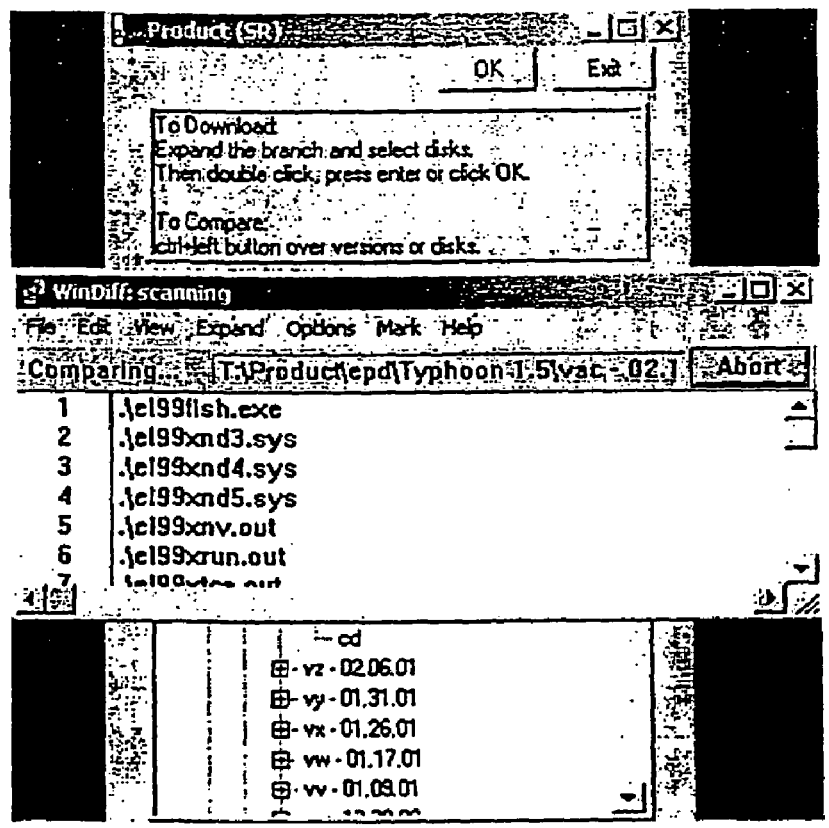
FIG. 11 shows a presentation depicting the results of a comparison in accordance with one embodiment of the present invention.

FIG. 4 shows the users view of the product server component 125 through the graphical user interface 112. FIG. 5 shows the tree structure view of the directory tree structure 122 created by the client component 111. FIG. 6 shows the case where the user selects (e.g., double-clicks) a desired software product version to be download to client machine 110. The user is prompted for a location for the download. FIG. 7 shows the graphical user interface presentation wherein the target location for download does not exist, and the user is prompted for creating a target directory for the download. FIG. 8 shows the presentation to the user once the the download process has begun. FIG. 9 shows the source and target paths of the download in order to allow the user to verify the correct file(s) were transferred. FIG. 10 shows the comparing functionality presentation seen by the user when two different software product versions are compared. As described above, such a comparison can be used during regression testing. FIG. 11 shows a presentation depicting the results of a comparison.

Computer System Platform

Figure 12:
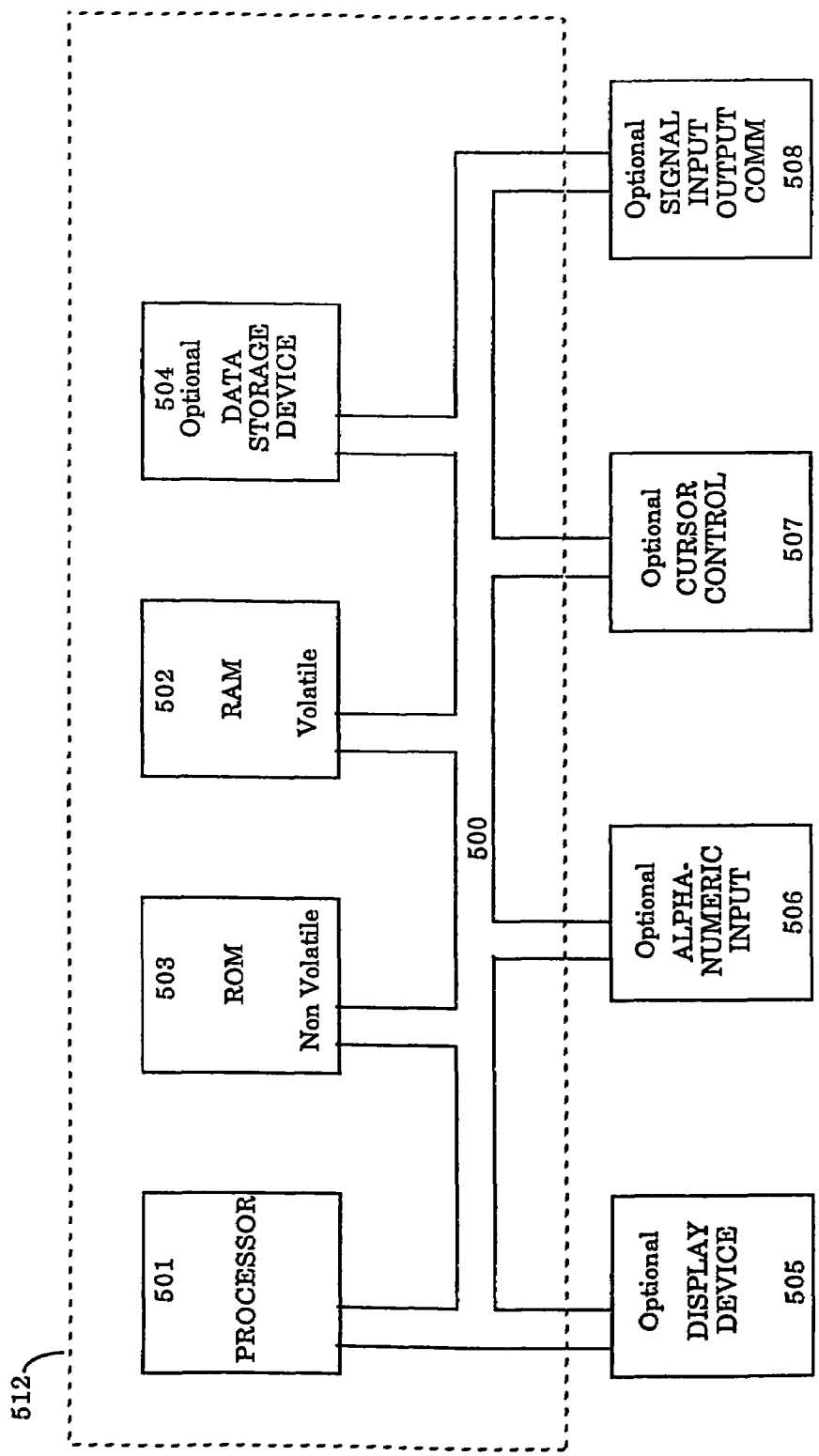
FIG. 12 shows the components of a computer system platform in accordance with one embodiment of the present invention.

With reference now to FIG. 12, a computer system 512 in accordance with one embodiment of the present invention is shown. Computer system 512 shows the components of a computer system in accordance with one embodiment of the present invention that provides the execution platform for implementing certain software based functionality of the present invention. As described above, certain processes and steps of the present invention are realized, in one embodiment, as a series of instructions (e.g., software program) that reside within computer readable memory units of a computer system (e.g., system 512) and are executed by the processor(s) of system 512. When executed, the instructions cause the computer system 512 to implement the functionality of the present invention as described above.

In general, computer system 512 shows the basic components of a computer system used to implement "server" machines and "client" machines. Computer system 512 comprises an address/data bus 500 for communicating information, one or more central processors 501 coupled with the bus 500 for processing information and instructions, a computer readable volatile memory unit 502 (e.g., random access memory, static RAM, dynamic, RAM, etc.) coupled with the bus 500 for storing information and instructions for the central processor(s) 501, a computer readable non-volatile memory unit (e.g., read only memory, programmable ROM, flash memory, EPROM, EEPROM, etc.) coupled with the bus 500 for storing static information and instructions for the processor(s) 501. System 512 also includes a mass storage computer readable data storage device 504 such as a magnetic or optical disk and disk drive coupled with the bus 500 for storing information and instructions. Optionally, system 512 can include a display device 505 coupled to the bus 500 for displaying information to the computer user, an alphanumeric input device 506 including alphanumeric and function keys coupled to the bus 500 for communicating information and command selections to the central processor(s) 501, a cursor control device 507 coupled to the bus for communicating user input information and command selections to the central processor(s) 501, and a signal generating device 508 coupled to the bus 500 for communicating command selections to the processor(s) 501.

Thus, embodiments of the present invention are directed towards a computer implemented method for maintaining software product version tracking. The present invention provides a solution that renders the software configuration management process much easier than the prior art. The present invention provides a solution that simplifies the changing and maintaining of different software product versions within a software development/software quality assurance environment.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for maintaining software product version tracking in a client/server computer system environment, the method comprising:
   storing a plurality of software product versions within a single database;
   traversing a plurality of directories of the single database to determine paths for each of the plurality of software product versions, the traversing performed by a server;
   selecting one of the software product versions for updating, the selecting performed by one of a plurality of clients;
   receiving a copy of the selected one of said software product versions at said one client, wherein the selecting and receiving of one of the software product versions for updating does not limit a second client from selecting and receiving the same one of the software product versions received by said one client from said single database;
   editing the one software product version using the one client and returning a resulting new software product version to the single database; and
   using the server, updating the directories of the single database to chronologically track the new software product version to ensure the paths for each of the plurality of software product versions and the new software product version are available to the plurality of clients.

2. The method of claim 1 further including:
   executing a server component on the server in order to make the new software product version visible to the plurality of clients.

3. The method of claim 1 further including:
   using the server, creating a file containing the paths for each of the software product versions, the file used by the clients to access to software product versions.

4. The method of claim 1 further including:
   using the server, maintaining a chronological arrangement of the software product versions; and
   maintaining a tree structure for tracking one or more chronological arrangements of the software product versions.

5. The method of claim 4 further including:
   maintaining a plurality of tree structures for a respective plurality of software product development projects to maintain the software product version tracking.

6. The method of claim 4 further including:
   using a graphical user interface of the client to access to tree structure of the chronological arrangements of the software product versions.

7. The method of claim 1 further including:
   using a graphical user interface of the client to select the one software product version for updating.

8. The method of claim 1 wherein the server and the plurality of clients are communicatively coupled via a local area network.

9. The method of claim 1 wherein the server and at least one of the plurality of clients are communicatively coupled via the Internet.

10. A system for maintaining software product version tracking in a client/server computer system environment, the system comprising:
    a client-server computer system coupled via a network, the client server computer system configured to execute computer readable code for implementing a method for product version tracking, the method comprising:

storing a plurality of software product versions within a single database;
traversing a plurality of directories of the single database to determine paths for each of the plurality of software product versions, the traversing performed by a server;
selecting one of the software product versions for updating, the selecting performed by one of a plurality of clients;
receiving a copy of the selected one of said software product versions at said one client, wherein the selecting and receiving of one of the software product versions for updating does not limit a second client from selecting and receiving the same one of the software product versions received by said one client from said single database;
editing the one software product version using the one client and returning a resulting new software product version to the single database; and
using the server, updating the directories of the single database to chronologically track the new software product version to ensure the paths for each of the plurality of software product versions and the new software product version are available to the plurality of clients.

11. The system of claim 10 further including:
executing a server component, on the server in order to make the new software product version visible to the plurality of clients.

12. The system of claim 10 further including:
using the server, creating a file containing the paths for each of the software product versions, the file used by the clients to access to software product versions.

13. The system of claim 10 further including:
using the server, maintaining a chronological arrangement of the software product versions; and maintaining a tree structure for tracking one or more chronological arrangements of the software product versions.

14. The system of claim 13 further including:
maintaining a plurality of tree structures for a respective plurality of software product development projects to maintain the software product version tracking.

15. The system of claim 13 further including:
using a graphical user interface of the client to access to tree structure of the chronological arrangements of the software product versions.

16. The system of claim 10 further including:
using a graphical user interface of the client to select the one software product version for updating.

17. The system of claim 10 wherein the server and the plurality of clients are communicatively coupled via a local area network.

18. The system of claim 10 wherein the server and at least one of the plurality of clients are communicatively coupled via the Internet.

19. A computer readable media having thereon computer readable code which when executed in a client server computer system cause the computer system to implement a method for maintaining software product version tracking, the method comprising:
storing a plurality of software product versions within a single database;
traversing a plurality of directories of the single database to determine paths for each of the plurality of software product versions, the traversing performed by a server;
selecting one of the software product versions for updating, the selecting performed by one of a plurality of clients;
receiving a copy of the selected one of said software product versions at said one client, wherein the selecting and receiving of one of the software product versions for updating does not limit a second client from selecting and receiving the same one of the software product versions received by said one client from said single database;
editing the one software product version using the one client and returning a resulting new software product version to the single database; and
using the server, updating the directories of the single database to chronologically track the new software product version to ensure the paths for each of the plurality of software product versions and the new software product version are available to the plurality of clients.

20. The computer readable media of claim 19 further including:
using the server, creating a file containing the paths for each of the software product versions, the file used by the clients to access to software product versions.

21. The computer readable media of claim 19 further including:
using the server, maintaining a chronological arrangement of the software product versions; and
maintaining a tree structure for tracking one or more chronological arrangements of the software product versions.

22. The computer readable media of claim 21 further including:
maintaining a plurality of tree structures for a respective plurality of software product development projects to maintain the software product version tracking.

23. The computer readable media of claim 21 further including:
using a graphical user interface of the client to access to tree structure of the chronological arrangements of the software product versions.

24. The computer readable media of claim 19 further including:
using a graphical user interface of the client to select the one software product version for updating.

* * * * *